US005574104A

United States Patent [19]

Kolycheck et al.

[11] Patent Number: 5,574,104
[45] Date of Patent: Nov. 12, 1996

[54] CHAIN EXTENDED LOW MOLECULAR WEIGHT POLYOXIRANES AND ELECTROSTATIC DISSIPATING BLEND COMPOSITIONS BASED THEREON

[75] Inventors: Edmond G. Kolycheck, Lorain; Elaine A. Mertzel, Rocky River; Francis R. Sullivan, Cleveland Heights; Gary F. Wilson, Grafton; Timothy E. Fahey, North Ridgeville, all of Ohio

[73] Assignee: The B. F. Goodrich Company, Akron, Ohio

[21] Appl. No.: 533,877

[22] Filed: Sep. 26, 1995

Related U.S. Application Data

[63] Continuation of Ser. No. 265,568, Jun. 24, 1994, abandoned, which is a continuation of Ser. No. 717,949, Jun. 20, 1991, abandoned, which is a continuation-in-part of Ser. No. 461,606, Jan. 5, 1990, abandoned.

[51] Int. Cl.$^6$ ............... C08L 75/08; C08L 77/00; C08L 69/00; C08L 71/12
[52] U.S. Cl. ............... 525/130; 524/910; 525/395; 525/399; 525/424; 525/458; 525/460; 525/467; 528/76
[58] Field of Search ............... 524/910; 525/395, 525/399, 424, 458, 460, 467, 130; 528/76

[56] References Cited

U.S. PATENT DOCUMENTS

| | | | |
|---|---|---|---|
| 2,948,691 | 8/1960 | Windemuth et al. | 525/127 |
| 3,049,505 | 8/1962 | Grabowski et al. | 260/45.4 |
| 3,214,411 | 10/1965 | Saunders et al. | 528/67 |
| 3,425,981 | 2/1969 | Puletti et al. | |
| 3,539,482 | 11/1970 | Stewart | 524/591 |
| 3,625,915 | 12/1971 | Gubler et al. | |
| 3,660,010 | 5/1972 | Georgoudis et al. | 8/115.6 |
| 3,706,710 | 12/1972 | Camilleri et al. | |
| 3,718,715 | 2/1973 | Crawford et al. | 525/173 |
| 3,810,956 | 5/1974 | Kimura et al. | 525/430 |
| 3,876,725 | 4/1975 | Wells et al. | |
| 3,882,190 | 5/1975 | Wells | |
| 3,887,644 | 6/1975 | Wells | |
| 3,901,852 | 8/1975 | Shah | 528/85 |
| 3,923,924 | 12/1975 | Wells et al. | |
| 4,051,196 | 9/1977 | Wells et al. | |
| 4,093,676 | 6/1978 | Weipert et al. | |
| 4,159,975 | 7/1979 | Praetorius et al. | |
| 4,291,134 | 9/1981 | Hambrecht et al. | |
| 4,313,764 | 2/1982 | Tracy et al. | 525/440 |
| 4,379,913 | 4/1983 | Waitkus | |
| 4,408,013 | 10/1983 | Barnhouse | |
| 4,499,124 | 2/1985 | Pusineri et al. | 427/385.5 |
| 4,529,539 | 7/1985 | Monma et al. | 252/518 |
| 4,543,390 | 9/1985 | Tanaka et al. | |
| 4,588,773 | 5/1986 | Federl et al. | |
| 4,620,944 | 11/1986 | Armand et al. | 252/518 |
| 4,670,330 | 6/1987 | Ishiwata | 428/290 |
| 4,719,263 | 1/1988 | Barnhouse et al. | 525/187 |
| 4,751,118 | 6/1988 | Wypart et al. | |

(List continued on next page.)

FOREIGN PATENT DOCUMENTS

| | | |
|---|---|---|
| 0012559 | 6/1980 | European Pat. Off. . |
| 0104695 | 4/1984 | European Pat. Off. . |
| 0201097 | 12/1986 | European Pat. Off. . |
| 0212449 | 3/1987 | European Pat. Off. . |
| 0282985 | 9/1987 | European Pat. Off. . |
| 0303489 | 2/1988 | European Pat. Off. . |
| 0415177 | 3/1991 | European Pat. Off. . |
| 0453634 | 6/1991 | European Pat. Off. . |
| 0443767 | 8/1991 | European Pat. Off. . |
| 0453929 | 10/1991 | European Pat. Off. . |
| 0548741 | 6/1993 | European Pat. Off. . |
| 1127082 | 4/1962 | Germany . |
| 0018656 | 2/1978 | Japan . |
| 58-157861 | 9/1983 | Japan . |
| 309552 | 12/1988 | Japan . |
| 312342 | 12/1988 | Japan . |
| 559020 | 2/1944 | United Kingdom . |
| 747827 | 4/1956 | United Kingdom . |
| 897705 | 5/1962 | United Kingdom . |
| 1156784 | 7/1969 | United Kingdom . |
| 2049544 | 5/1979 | United Kingdom . |
| 2201154 | 8/1988 | United Kingdom . |
| 8903860 | 5/1989 | WIPO . |
| 9109906 | 7/1991 | WIPO . |

OTHER PUBLICATIONS

A. McLennaghan, A. Hooper & R. Pethrick, Eur. Polym. J. (1988), 25, 1297–1302.

"Effect of the Nature of Low–Molecular Diols of the Ethylene Oxide Series on the Properties of Poly(ester Urethane) Thermoplastic Elastomers", L. A. Cherkasova et al., Polymer Science U.S.S.R., vol. 14, 1972, No. 1, pp. 82–88.

Textbook of Polymer Science, Third Edition, Fred W. Billmeyer, Jr., "Polyesters, Polyethers, and Related Polymers", p. 417.

British Polymer Journal, vol. 7, No. 5, Sep. 1975, pp. 313–327, "Electrical conductivity in Ionic Complexes of Poly(*ethylene oxide)", Peter V. Wright.

Polymer Bulletin 23, 299–306 (1990), "Ionic Conductivity and Morphology of Complexes Formed by Polyurethanes and Lithium Perchlorate", Shinzo Kohjiya et al.

Article Entitled "Linear Segmented Polyurethane Electrolytes–I. Morphology + Physical Properties" by Allan W. McLennaghan and Richard A. Pethrick, Eur. Polym. J. vol. 24, No. 11 pp. 1063–1071, 1988.

Article entitled "Linear Segmented Polyurethane Electrolytes II. Conductivity andd Related Properties" by Allan M. McLennaghan, Alan Hooper and Richard Pethrick, Eur. Polym. J. vol. 25, No. 12, pp. 1297–1302, 1989.

Primary Examiner—Thomas Hamilton, III
Attorney, Agent, or Firm—Helen A. Odar

[57] ABSTRACT

The present invention relates to electrostatic dissipative polymeric compositions comprising a polyether polyurethane which can be blended with one or more base polymers. In some applications, the polyurethane is useful without further blending. Further, the polyurethane blends can be blended with glass beads or glass fibers which have a synergist effect when combined with the electrostatic dissipative agent.

14 Claims, No Drawings

U.S. PATENT DOCUMENTS

| | | | |
|---|---|---|---|
| 4,767,671 | 8/1988 | Parker et al. | 528/76 |
| 4,775,716 | 10/1988 | Kipneras et al. | |
| 4,806,598 | 2/1989 | Morman | 525/458 |
| 4,855,077 | 8/1989 | Shikinami et al. | 252/518 |
| 4,857,590 | 8/1989 | Gaggar et al. | |
| 4,877,856 | 10/1989 | Hall et al. | 528/44.79 |
| 4,892,901 | 1/1990 | Liu | 524/303 |
| 4,906,681 | 3/1990 | Wozniak | 54/314 |
| 4,912,142 | 3/1990 | Vermeulen et al. | 521/105 |
| 4,914,150 | 4/1990 | Prier | 524/701 |
| 4,920,167 | 4/1990 | Ruetman et al. | 524/155 |
| 4,931,506 | 6/1990 | Hu. | |
| 4,956,438 | 9/1990 | Ruetman et al. | 528/60 |
| 4,990,357 | 2/1991 | Karakelle et al. | 427/2 |
| 5,047,495 | 9/1991 | Kolycheck | 528/76 |
| 5,077,330 | 12/1991 | Ehrhart et al. | 528/76 |
| 5,096,934 | 3/1992 | Roberts et al. | 521/159 |
| 5,159,053 | 10/1992 | Kolycheck et al. | 528/76 |
| 5,237,009 | 8/1993 | Lee | 525/187 |

CHAIN EXTENDED LOW MOLECULAR WEIGHT POLYOXIRANES AND ELECTROSTATIC DISSIPATING BLEND COMPOSITIONS BASED THEREON

CROSS-REFERENCE

This a continuation of application Ser. No. 08/265,568 filed on Jun. 24, 1994 now abandoned is a continuation of application Ser. No. 07/717,949 filed on Jun. 20, 1991 now abandoned, which is a continuation in part of Ser. No. 07/461,606 filed on Jan. 5, 1990 now abandoned.

FIELD OF THE INVENTION

In the first embodiment, this invention relates to new electrostatic dissipating additives based on low molecular weight polyether oligomers which have been reacted with a diisocyanate to form a high molecular weight polymeric material having electrostatic dissipating properties.

In the present embodiment, new compositions are formed using these additives and based on the blend of the electrostatic dissipating additives with polyurethanes, polyamides, polycarbonates, polyolefins, and styrene polymers and copolymers. These compositions optionally include a synergist which can include one or more of glass beads, spheres, or fibers.

BACKGROUND

The formation and retention of charges of static electricity on the surface of most plastics is well known. Plastic materials have a significant tendency to accumulate static electrical charges due to low electrical conductivity. The presence of static electrical charges on sheets of thermoplastic film, for example, can cause the sheets to adhere to one another thus making their separation for further processing more difficult. Moreover, the presence of static electrical charges causes dust to adhere to items packaged in a plastic bag, for example, which may negate any sales appeal.

The increasing complexity and sensitivity of microelectronic devices makes the control of static discharge of particular concern to the electronic industry. Even a low voltage discharge can cause severe damage to sensitive devices. The need to control static charge buildup and dissipation often requires the total assembly environment to be constructed of partially conductive materials. It also may require electrostatic protective packages, tote boxes, casings, and covers be made from conductive polymeric materials to store, ship, protect, or support electrical devices and equipment.

The prevention of the buildup of static electrical charges which accumulate on plastics during manufacturing or use has been prevented by the use of various electrostatic dissipative (ESD) materials. These materials can be applied as a coating which may be sprayed or dip coated on the article after manufacture although this method usually results in a temporary solution. Alternatively these materials can be incorporated into the polymer during processing thereby providing a greater measure of permanence. However, the incorporation of these lower molecular weight electrostatic dissipative materials (antistatic agents) into the various polymers has its own limitations. For example, during the hot temperatures required during conventional processing many of the antistatic agents cannot withstand high temperatures and are damaged or destroyed, thereby being rendered useless with respect to their ESD properties. Also, many of the higher molecular weight ESD agents are not miscible with the base polymers employed, and if the refractive indices differ by more than about 0.02, there can be a substantial reduction in the transparency of the composition. These compositions may be unacceptable for transparent applications. For example, in an immiscible polymer blend where the dispersed phase particle size is greater than 0.1 micron the smaller the difference in the refractive indices between the additives and the base polymer the greater the clarity of the article made from the mixture.

A large number of antistatic agents are also either cationic or anionic. These tend to cause the degradation of plastics, particularly PVC, and result in discoloration or loss of physical properties. Other antistatic agents have significantly lower molecular weights than the base polymers themselves. Often these lower molecular weight antistatic agents possess undesirable lubricating properties and are difficult to incorporate into the polymer. Incorporation of the lower molecular weight antistatic agents into the polymers often will reduce the moldability of the base plastic because the antistatic agents can move to the surface of the plastic during processing and frequently deposit a coating on the surface of the molds, possibly destroying the surface finish on the articles of manufacture. In severe cases, the surface of the article of manufacture becomes quite oily and marbleized. Additionally, the lower molecular weight ESD agents often tend to lose their ESD capability due to evaporation, develop undesirable odors, and can promote stress cracking or crazing on the surface of an article in contact with the article of manufacture.

One of the known lower molecular weight antistatic agents is a homopolymer or copolymer oligomer of ethylene oxide. Generally, use of the lower molecular weight polymers of ethylene oxide or polyethers as antistatic agents are limited by the above-mentioned problems relative to lubricity, surface problems, or less effective ESD properties. Further, these low molecular weight polymers can be easily extracted or abraded from the base polymer thereby relinquishing any electrostatic dissipative properties.

There are several examples of high molecular weight electrostatic dissipative agents in the prior art. In general these additives have been high molecular weight polymers of ethylene oxide or a derivative thereof like propylene oxide, epichlorohydrin, glycidyl ethers and the like. It has been a requirement that these additives be high molecular weight materials to overcome the problems mentioned above. However, these prior art ESD additives result in articles having high haze values and thus are not transparent enough for some end uses.

Prior to the present invention the utilization of low molecular weight polyether oligomers as antistatic agents was impractical as these low molecular weight oligomers suffer from problems such as blooming.

SUMMARY OF THE INVENTION

In the first embodiment, the present invention relates to a chain extended polymer having electrostatic dissipative properties. The chain extended polymer is formed from low molecular weight polyethers which are reacted with a diisocyanate and a chain extender to furnish a useful additive. Many of these low molecular weight commercially available polyether materials without being further reacted would not be useful as anti-static agents because of their negative effects on the base polymers.

These low molecular weight polyether materials often have functional groups which are capable of acting as sites for chain extension. In a preferred form the polyether will have two (2) functional groups. It has been found that when the low molecular weight polyethers are reacted with a a diisocyanate (more broadly a diisocyanate type component) that the resulting polymers will be of high molecular weight. The polymers of this invention can be modified by varying the molecular weight of the polyether oligomer or the nature of the diisocyanate, so that the physical, electrical, or optical properties can be tailored for specific applications. For example, the index of refraction of an ESD polymer can then be matched to that of a base polymer thereby providing a clear composition. Further, the properties of the polymer of this invention can be altered by the addition of a chain extended (i.e., a diol).

In a new embodiment, the present invention relates to electrostatic dissipative polymeric blend compositions comprising an effective amount of the chain extended polymer blended with a base polymer. The base polymer can be selected from the group including polyurethanes, polyamides, polycarbonates, polyolefins and polystyrenes (including copolymers of styrene). The base polymer can also comprise blends of more than one of the foregoing with the ESD agent. Further, glass beads, hollow glass spheres, or polyvinyl chloride may be added to these blend compositions as synergists to improve the ESD properties of the blend composition. The chain extended polymer is effective as a static dissipative agent in the range of from about 3 parts to about 100 parts by weight per 100 parts by weight of the base polymer in the polymeric composition.

DETAILED DESCRIPTION OF THE PREFERRED EMBODIMENTS

The present invention relates to a chain extended polymer having electrostatic dissipative properties comprising (A) a low molecular weight polyether oligomer having two reactive moieties and an average molecular weight from about 200 to about 10,000 wherein the oligomer is a homopolymer or a copolymer of two or more copolymerizable cyclic ether monomers having the formula:

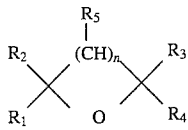

wherein $R_1$, $R_2$, $R_3$, $R_4$, and $R_5$ are independently hydrogen, unsubstituted or substituted alkyl, cycloalkyl, cycloalkenyl, aryl, aralkyl or alkaryl, and wherein the substituents which can be substituted within the foregoing are $OR_6$, $SR_6$, CN or halogens, $R_6$ is hydrogen, alkyl, cycloalkyl, cycloalkenyl, aryl, aralkyl, alkaryl, or carboxyl, and further wherein the reactive moieties are OH, $NH_2$, or $NHR_6$, and n is 0, 1, 2, or 4; (B) from about 0 moles to about 35 moles of a diol or triol for each mole of low molecular weight polyether and (C) a diisocyanate or diisocyanate type component; with the proviso that the number of moles of diisocyanate per mole of the sum of the number of moles of low molecular weight polyether oligomer plus the number of moles of diol or triol is from about 0.95 to about 1.06. In a preferred embodiment the number of moles of diisocyanate per mole of the sum of the number of moles of low molecular weight polyether oligomer plus the number of moles of diol or triol is from about 0.97 to about 1.03. By low molecular weight oligomer, it is meant that the polyether will have an average molecular weight from about 200 to about 10,000 and preferably from about 500 to about 5000, as determined by end group analysis. The reaction of the low molecular weight oligomer with a diisocyanate will furnish a polymer having melt indices from 0.05 to 110 grams per ten minutes. The preferred melt index range of the polymer will be from about 1.0 to 65 grams/10 minutes. In general, the melt index is determined according to ASTM D-1238 Procedure A at a barrel temperature of 190° C. and an 8700 gram piston load.

In a preferred embodiment the low molecular weight oligomer employed is a polymer of cyclic ether monomers having the formula:

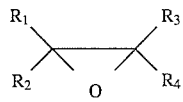

In a more preferred embodiment the low molecular weight oligomer employed is a polymer of cyclic ether monomers wherein $R_1$, $R_2$ and $R_3$ are hydrogen and $R_4$ is H, $CH_3$, or $CH_2X$ wherein X is a halogen, $OR_6$, $NR_6R_7$ or $COOR_6$, and $R_6$ and $R_7$ are as defined herein-above.

The most preferred cyclic ether is ethylene oxide.

In an alternative embodiment the low molecular weight polyether oligomer is end capped with ethylene oxide or ethylene imine thereby providing an oligomer which will have two primary moieties.

The alkyl groups can have from 1 to 6 carbon atoms, be straight or branched chain and may be unsubstituted or substituted. The alkenyl groups can have from 1 to 6 carbon atoms, be straight or branched chain, have 1 or two double bonds and be unsubstituted or substituted.

The cycloalkyl and cycloalkenyl groups can have from 3 to 8 ring carbon atoms and from 1 to 3 rings. The cycloalkenyl groups can have 1 or 2 double bonds.

The aryl groups can have from 6 to 10 ring carbon atoms and one or two rings.

Useful polyether oligomers are linear polymers having the general formula:

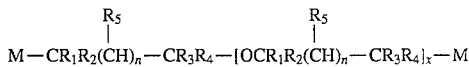

wherein X+1 is the number of repeating ether units, each M is a reactive moiety, n is 0,1,2, or 4 and $R_1$, $R_2$, $R_3$, $R_4$ and $R_5$ are as defined hereinabove. The most common M is the OH group. For the subject invention X+1 is at least 4 and between 4 and about 250. On a molecular weight basis, the useful range of polyether oligomers have an average molecular weight from about 200 to 10,000 and preferably from about 500 to 5000. A highly preferred oligomer is polyethylene glycol. Commercially available polyethylene glycols useful in this invention are typically designated as polyethylene glycol 600, polyethylene glycol 1450, and polyethylene glycol 4000.

The polyether oligomer can be a homopolymer or a copolymer of two or more copolymerizable monomers. Some examples of monomers are ethylene oxide, propylene oxide, 1,2-butylene oxide, epichlorohydrin, allyl glycidyl ether, n-butyl glycidyl ether, glycidyl acrylate, glycidyl methacrylate, 2-ethylhexyl glycidyl ether, tetrahydrofuran, or styrene oxide.

The present invention also relates to electrostatic dissipative polymeric compositions comprising an effective amount of the chain extended polymer and a base polymer or base polymer blend. The chain extended polymer is effective as a static dissipative in the range of from about 3 parts to about 100 parts by weight wherein the total of the base polymer or polymer blend is 100 weight parts. In a preferred form the composition can have from about 5 parts to about 35 parts of the chain extended polymer per 100 parts by weight of the base polymer or base polymer blend.

There are several applications for electrostatic dissipative materials which have a high degree of clarity. The requirements for transparent materials are dependent upon the thickness of the specimen. Generally, for transparent applications the refractive indices of the components of the polymeric composition can differ from about 0.01 to about 0.1. In a preferred form the difference in refractive indices will be about 0.02. In general, if the refractive index between the two materials differs by more than 0.02, there is a substantial reduction in the transparency of the composition. Refractive indices are measured using a film having a thickness of about 0.5 mm or less and the sodium D line on standard equipment, well known in the art.

It has been found that altering the percentage of the polyether oligomer in the chain extended polymer can cause the refractive index of the polymer to be changed.

The clarity of the composition will further depend upon amount of the ESD additive in the composition. In the preferred composition the difference between the refractive index of the chain extended polymer and the base polymer blend is 0.02 or less.

The present invention also relates to a clear polyvinyl chloride composition comprising polyvinyl chloride and an effective amount of an electrostatic dissipative additive said composition having the following electrical properties:

(a) surface resistivity of less than about $1 \times 10^{14}$ Ohms/sq, as measured according to ASTM D-257; or (b) volume resistivity of less than about $1 \times 10^{14}$ Ohms-cm, as measured according to ASTM D-257. Clarity can be defined as follows:
  a percent light transmission greater than 50% for 20 mil film as measured according to ASTM D-1003-61; and
  a percent haze value less than 60% for a 20 mil film as measured using a Hunterlab model D-54P-5 spectrophotometer or equivalent.

The spectrophotometer was calibrated with haze standards having nominal values of 5 and 10, Part No. HG-1214, as supplied by Gardner Laboratory Division, Bethesda, Md.

In a preferred embodiment the surface resistivity will be less than about $1 \times 10^{13}$ Ohms/sq, and the volume resistivity will be less than about $1 \times 10^{13}$ Ohms-cm. In the most preferred embodiment the surface resistivity of composition will be less than about $1 \times 10^{12}$ Ohms/sq, and the volume resistivity less than about $1 \times 10^{12}$ Ohms-cm. The preferred light transmission is greater than 70% for a 20 mil film as measured according to ASTM D-1003-61; and the preferred haze value is less than 30% for a 20 mil film. The most preferred light transmission is greater than 80% for a 20 mil film as measured according to ASTM D-1003-61; and the most preferred haze value is less than 20% for a 20 mil film. Surface and volume resistivity testing is conducted in accordance with ASTM D257. An adapter compresses an upper electrode and a lower circular electrode encircled with a ringing electrode. A sheet sample (3.5 inches in diameter and ⅛–1/16 inch thick) was placed between the upper and lower electrodes, and a voltage of 500 volts was applied between the electrodes. After 60 seconds, the current was recorded using an ampmeter and converted into surface resistivity in Ohms/square or volume resistivity in Ohms-cm. The static decay test is carried out in accordance with Federal Test Method Standard 101 B, Method 4046.1, "Electrostatic Properties of Materials" with a Static Decay Meter, model 406 C obtained, from Electro-Tech Systems, Inc. Static decay is a measure of the ability of a material, when grounded, to dissipate a known charge that has been induced on the surface of the material. A sheet sample (3"×6") with ⅛–1/16 inch thickness is placed between clamp electrodes contained in a Faraday cage. A 5,000 volt positive charge is applied to the surface of the specimen and the time in seconds required to dissipate the charge to 500 volts (10% of its initial value) or to 50 volts (1% of its initial value), after a ground is provided, is then measured. This test was run on unconditioned samples and on samples conditioned for 48 hours at 15% relativity humidity (RH).

The base polymer as defined herein can be a homopolymer or a copolymer for example, polyvinyl chloride, chlorinated polyvinyl chloride, copolymers of styrene and acrylonitrile, terpolymers of styrene, acrylonitrile, and diene rubber, copolymers of styrene and acrylonitrile modified with an acrylate elastomer, copolymers of styrene and acrylonitrile modified with ethylene propylene diene monomer rubber, polystyrene and rubber modified impact polystyrene, nylon, polycarbonate, thermoplastic polyesters including polybutylene terephthalate, polyethylene terephthalate and polyether-ester block copolymers, polyurethane, polyphenylene oxide, polyacetal, polymethyl methacrylate. The base polymer can be further blended with one or more other polymeric materials, e.g., another base polymer, along with the electrostatic dissipative additive or other additives known in the art.

Polyvinyl chloride, PVC, vinyl polymer, or vinyl polymer material, as used herein, refers to homopolymers and copolymers of vinyl halides and vinylidene halides and includes post halogenated vinyl halides such as CPVC. Examples of these vinyl halides and vinylidene halides are vinyl chloride, vinyl bromide, vinylidene chloride and the like. The vinyl halides and vinylidene halides may be copolymerized with each other or each with one or more polymerizable olefinic monomers having at least one terminal $CH_2=C<$ grouping. As examples of such olefinic monomers there may be mentioned the $\alpha,\beta$-olefinically unsaturated carboxylic acids, such as acrylic acid, methacrylic acid, ethylacrylic acid, $\alpha$-cyanoacrylic acid, and the like; esters of acrylic acid, such as methyl acrylate, ethyl acrylate, butyl acrylate, octyl acrylate, cyanoethyl acrylate, hydroxyethyl acrylate, and the like; esters of methacrylic acid, such as methyl methacrylate, butyl methacrylate, hydroxyethyl methacrylate, and the like; nitriles, such as acrylonitrile, methacrylonitrile, and the like; acrylamides, such as methyl acrylamide, N-methylol acrylamide, N-butyoxy methylacrylamide, and the like; vinyl ethers, such as ethyl vinyl ether, chloroethyl vinyl ether, and the like; the vinyl ketones; styrene and styrene derivatives, such as $\alpha$-methyl styrene, vinyl toluene, chlorostyrene, and the like; vinyl naphthalene, allyl and vinyl chloroacetate, vinyl acetate, vinyl pyridine, methyl vinyl ketone; the diolefins, including butadiene, isoprene, chloroprene, and the like; and other polymerizable olefinic monomers of the types known to those skilled in the art.

The present invention is particularly applicable to homopolymers and copolymers made by the polymerization of vinyl chloride or vinylidene chloride alone or in admixture with one or more polymerizable olefinic monomers copolymerizable therewith in amounts up to about 20% by weight, based on the weight of the monomer mixtures. Some copolymers have a tendency to decrease the clarity of the article and therefor the comonomer amount in the copolymer should be minimized. The most preferred vinyl polymer, or resin, is polyvinyl chloride (PVC) homopolymer produced by the mass or suspension polymerization process and the invention, for simplicity and convenience, will be described in connection therewith, it being understood that this merely intended in an illustrative sense and not limitative. Articles of this invention may be made from resins produced by the suspension, mass, emulsion or solution processes.

In accordance with the present invention, the low molecular weight polyether oligomer intermediate and the non-hindered diisocyanate are co-reacted simultaneously in a one-shot polymerization process at a temperature above about 100° C. and usually about 120° C., whereupon the reaction is exothermic and the reaction temperature is increased to about 200° C. to 285° C.

At times, the polyether oligomer can be blended with a glycol chain extender before reaction with a diisocyanate. The glycol chain extender may be any diol (i.e., glycol) or combination of diols, containing 2 to 10 carbon atoms, such as ethylene glycol, 1,3-propanediol, propylene glycol, 1,4-butanediol, 1,3-butanediol, 1,5-pentanediol, 1,6-hexanediol, diethylene glycol, 1,4-cyclohexane dimethanol, neopentyl glycol, hydroquinone bis(2-hydroxyethyl) ether, or any aliphatic or aromatic molecule containing two reactive hydroxyl groups. The preferred chain extender is 1,4-butanediol.

In general, for each mole of polyether oligomer employed, the amount of diisocyanate employed will be about 1.0 moles. If a glycol modifier is employed, the sum of the moles of the chain extender plus the moles of polyether oligomer will be at a ratio of about 1.0 mole for each 1.0 mole of diisocyanate.

The hydroxyl or amino terminated polyols described above can be blended with a glycol chain extender before the blend is reacted with a polyisocyanate or the polyol and the chain extender can be brought to the reaction zone simultaneously. If desired, the polyol can be reacted with the diisocyanate, then the prepolymer is reacted with the chain extender. Stabilizers such as antioxidants can be added prior to the reaction or during the reaction.

The amount of glycol chain extender is generally from about 0 to about 35 moles and desirably from about 0 to about 20 moles for every mole of low molecular weight polyether oligomer. Generally, the number of moles of diisocyanate per total of the number of moles of the low molecular weight polyether oligomer plus the number of moles of chain extender is from about 0.95 to about 1.06 and preferably from about 0.97 to about 1.03.

In an alternative procedure two or more of the polyether oligomers can be reacted with a diisocyanate to furnish an oligomer dimer or trimer. These dimers or trimers can then be chain extended under similar conditions to form the high molecular weight polymer. This procedure can be used to produce a high molecular weight chain extended polymer with varying polyisocyanate groups.

Conventional diisocyanate or polyisocyanate type component are molecules having two functional groups (reactive sites) which will react with the reactive moieties of the polyethers.

The reactive moieties typically occur at the ends of the polyether oligomers as a result of routine synthesis, however the reactive moieties can be located at locations other than the ends. The reactive moieties most useful for the present invention are OH, $NH_2$ and $NHR_6$. In a preferred form the reactive moieties are OH, $NH_2$ or $NHR_6$ and are on primary carbon atoms. The most preferred reactive moiety is OH.

Some examples of these diisocyanate or diisocyanate type component are organic diacids, acid derivatives, such as diesters, diacyl halides, and the like, diisocyanates or any other difunctional molecule or oligomer which can react with the polyether oligomer moieties. Some examples of useful diacid derivatives are diethyl or dimethyl esters of carbonic acid, oxalic acid, malonic acid, succinic acid, glutaric acid, adipic acid, pimelic acid, sebacic acid, phthalic acid, and the like. Acyl halides which are effective in this invention are acyl chlorides of carbonic acid, oxalic acid, malonic acid, succinic acid, glutaric acid, adipic acid, pimelic acid, sebacic acid, phthalic acid and the like.

Any conventional diisocyanate can be used, either aliphatic or aromatic. In a preferred embodiment diisocyanates are utilized. Suitable diisocyanates include, for example, 1,4-diisocyanatobenzene (PPDI), 4,4'-methylenebis(phenyl isocyanate) (MDI), 4,4'-methylenebis(3-methoxy phenyl isocyanate), 1,5-naphthalene diisocyanate (NDI), toluene diisocyanate (TDI), m-xylene diisocyanate (XDI), 1,4-cyclohexyl diisocyanate (CHDI), 1,10-diisocyanatonaphthylene, and 4,4'-methylenebis- (cyclohexyl isocyanate) ($H_{12}$ MDI). The most preferred diisocyanate is MDI.

The subject invention contemplates the process for preparing an electrostatic dissipative polymeric composition comprising the steps of adding to a base polymer an effective amount of the chain extended polymer and mixing the polymers to produce the electrostatic dissipative composition.

The compositions of the present invention are useful for a variety of applications. Some examples are tubes, paper trays, floor tiles, machine housings, tote bins, and polymeric films.

Various conventional additives can be utilized in the compositions of the present invention. Thus, heat stabilizers, lubricants, heat distortion additives, impact modifiers, fire retardants, antioxidants, UV inhibitors, and processing aids generally employed for use in polymers, can be implemented. Moreover, plasticizers, such as those typically used and known to one skilled in the art can also be utilized. Various fillers and pigments can also be employed in conventional amounts. The amounts and types of additives, fillers and/or pigments required are well known to those skilled in the art.

EXAMPLES

The invention will now be illustrated by examples. The examples are not intended to be limiting of the scope of the present invention. In conjunction with the general and detailed description above, the examples provide further understanding of the present invention and demonstrates some of the preferred embodiments of the invention.

The following Example Nos. 1 to 5 describe the preparation of several chain extended polymers. Example 6 illustrates the methods for blending the chain extended polymer with a base polymer. The remaining Example Nos. 7 to 10 describe various compositions that were prepared and the results of tests, i.e., measurement of the electrical and optical properties, that were carried out to evaluate the materials.

In general, the examples described hereinbelow have been optimized for polyvinyl chloride. Further experimentation would allow an investigator to optimize the properties and get a chain extended polymer useful for any base polymer system.

Example 1

Polyethylene glycol (Dow E-600), 0.2 moles (121 grams) having a molecular weight of 603 as determined by end group analysis was reacted with 0.201 moles (50.25 grams)

of 4,4'-methylene-bis(phenyl isocyanate) (MDI) by a standard high temperature random melt polymerization procedure. The polymerization procedure involved heating the polyether and MDI separately to about 100° C. and then mixing the ingredients. The reaction is exothermic and raises the temperature to about 200°to 285° C. in about 1 to 5 minutes, during which time polymerization takes place as evidenced by an increase in viscosity. The sample was molded into a plaque and the physical properties were measured. The sample had a volume resistivity of $4.9 \times 10^{10}$ Ohms-cm and a surface resistivity of $8.7 \times 10^{12}$ Ohms/sq.

Example 2

Polyurethane 45

Polyethylene glycol (Dow E-1450), 0.2 moles (290 grams) having a molecular weight of 1450 as determined by end group analysis was blended at 60° C. with 0.844 moles (76.064 grams) of 1,4-butane diol. This blend or physical mixture was then reacted with 1.044 moles (26.27 grams) of 4,4'-methylene-bis(phenyl isocyanate) (MDI) by a standard high temperature random melt polymerization procedure as described in Example 1. The sample was molded into a plaque and the physical properties were measured. The sample had a volume resistivity of $5.4 \times 10^{10}$ Ohms-cm, a surface resistivity of $6.0 \times 10^{11}$ Ohms/sq and a refractive index of 1.551.

Example 3

Polyurethane 56

Polyethylene glycol (Dow E-1450), 0.2 moles (278 grams) having a molecular weight of 1390 as determined by end group analysis was blended at 60° C. with 0.496 moles (44.6 grams) of 1,4-butane diol. This blend or physical mixture was then reacted with 0.696 moles (174 grams) of 4,4'-methylene-bis (phenyl isocyanate) (MDI) by a standard high temperature random melt polymerization procedure as described in Example 1. The sample was molded into a plaque and the physical properties were measured. The sample had a volume resistivity of $4.2 \times 10^{10}$ Ohms-cm and a refractive index of 1.541.

Example 4

Polyurethane 64

Polyethylene glycol (Dow E-1450), 0.4 moles (580 grams) having a molecular weight of 1450 was blended at 60° C. with 0.667 moles (60 grams) of 1,4-butane diol. This blend or physical mixture was then reacted with 1.078 moles (269.5 grams) of 4,4'-methylene-bis(phenyl isocyanate) (MDI) by a standard high temperature random melt polymerization procedure as described in Example 1. The sample was molded into a plaque and the physical properties were measured. The sample had a volume resistivity of $3.6 \times 10^9$ Ohms-cm, a surface resistivity of $4.7 \times 10^{10}$ Ohms/sq, and a refractive index of 1.529.

Example 5

Polyurethane 72

Polyethylene glycol (Dow E-1450), 0.3 moles (426 grams) having a molecular weight of 1420 as determined by end group analysis was blended at 60° C. with 0.267 moles (24 grams) of 1,4-butane diol. This blend or physical mixture was then reacted with 0.564 moles (141 grams) of 4,4'-methylene-bis (phenyl isocyanate) (MDI) by a standard high temperature random melt polymerization procedure as described in Example 1. The sample was molded into a plaque and the physical properties were measured. The sample had a volume resistivity of $9.5 \times 10^9$ Ohms-cm and a refractive index of 1.518.

Example 6

MIXING PROCEDURES

A. Compression Molding

In a Waring blender, 115 g of polyvinyl chloride resin, 3.45 g of organotin stabilizer, and about 2.0 g of an antioxidant were blended. To this mixture was added 23.0 g of the chain extended polymer of Example 2 (polyurethane 45). This was then milled to a uniform blend on a two roll mill at 340°–350° F. for approximately 5–10 minutes. The mixture was removed from the mill and compression molded at 356° F. to produce a uniform plaque from which electrical and static decay results were measured. This example represents a formulation having 20 phr of chain extended polymer in polyvinyl chloride resin.

B. Injection Molding

The following ingredients, 1557 g of polyvinyl chloride resin, 47.3 g of an organotin stabilizer, 31.6 g an antioxidant and 7.9 g of a lubricant were mixed in a Henschel mixer for 2–3 minutes. The mixture was then placed on a two roll mill at 320°–330° F. and 473.3 g of polyurethane 45 was added and the whole was milled for 10–15 minutes. The milled sheet was granulated, and then injection molded at 370°–395° F. Surface resistivity of the molded plaques was $4.8 \times 10^{11}$ Ohms/sq and volume resistivity was $2.6 \times 10^{11}$ Ohms-cm. Static decay results are given in Table I.

Example 7

The chain extended polymer of Example 2 (polyurethane 45) was compression molded into plaques. The static decay and volume resistivity was then measured. Also, several blends, i.e. different loadings of polyurethane 45 in PVC were prepared and compression molded the static decay rates were measured after being conditioned for 48 hours at 15% relative humidity (RH) and unconditioned. These results are summarized in Table I. The volume resistivity of the plaques was also measured. These results are summarized in Table II.

TABLE I

| PVC | | STATIC DECAY TIME (Seconds) | |
|---|---|---|---|
| Base Polymer Parts by Wt. | Polyurethane 45 Parts by Wt. | 15% RH 10% | 0% |
| 0 | 100 | 0.19 | 0.43 |
| 100 | 20 | 5.6 | >60 |
| 100 | 25 | 1.1 | 5.1 |
| 100 | 30 | 0.5 | 1.8 |
| 100 | 40 | 0.2 | 0.5 |
| 100 | *30 | 0.5 | 1.9 |

*Injection molded

TABLE II

| ELECTRICAL RESISTIVITY PVC/POLYURETHANE 45 | | |
|---|---|---|
| Polyurethane 45 Wt. Pts./ 100 Wt. Pts. PVC | Surface Resistivity Ohms/sq | Volume Resistivity Ohms-cm |
| 20 | $4.8 \times 10^{13}$ | $2.8 \times 10^{13}$ |
| 25 | $3.0 \times 10^{12}$ | $1.5 \times 10^{13}$ |

TABLE II-continued

ELECTRICAL RESISTIVITY
PVC/POLYURETHANE 45

| Polyurethane 45 Wt. Pts./ 100 Wt. Pts. PVC | Surface Resistivity Ohms/sq | Volume Resistivity Ohms-cm |
|---|---|---|
| 30 | $1.2 \times 10^{13}$ | $2.8 \times 10^{12}$ |
| 40 | $4.8 \times 10^{11}$ | $1.5 \times 10^{12}$ |

Example 8

The chain extended polymer of Example 2 (polyurethane 45) was blended with several resins, CPVC, ABS, polystyrene, and a vinyl chloride/acrylate copolymer using the procedure described in Example 6A. The blends contain 30 parts by weight of polyurethane 45 per 100 parts of the base polymer except for the poly styrene sample which contained 100 parts by weight of polyurethane 45 per 100 parts of the base polymer. These blends were compression molded and the static decay time was measured. The results are summarized in Table III below.

TABLE III

Polyurethane 45
30 Parts by Weight Per 100 Parts by Weight of Base Polymer

| | STATIC DECAY TIME (Seconds) | |
|---|---|---|
| Base Polymer | 10% | 15% RH 0% |
| CPVC[1] | 0.04 | 0.45 |
| ABS[2] | 0.09 | 0.20 |
| Polystyrene[3] (100 phr) | 1.14 | 2.89 |
| Acrylate[4] Copolymer | 0.5 | 1.89 |
| PVC (resin) | 0.5 | 1.8 |

[1]Chlorinated PVC sold as Temprite 3504 by The B. F. Goodrich Company.
[2]Acrylonitrile/Butadiene/Styrene polymer sold as Abson 820X17 by General Electric.
[3]Gulf MC-2100.
[4]Injection molded.
*Not Measured Example 9

Several chain extended polymers were prepared polyurethane 45, polyurethane 56, polyurethane 64 and polyurethane 72 each having 45, 56, 64 and 72 percent ethylene oxide oligomer, respectively. Compositions were prepared using polyvinyl chloride and each of the polyurethanes. These blends contained 30 parts by weight of the respective polyurethane per 100 parts by weight of PVC. These blends were compression molded and the static decay was measured. The results are summarized in Table IV below.

TABLE IV

POLYURETHANES
30 Wt. Parts Polyurethane/100 Wt. Parts PVC

| | STATIC DECAY TIME (Seconds) | |
|---|---|---|
| Compound | 10% | 15% RH 0% |
| Polyurethane 45 | 0.5 | 1.8 |
| Polyurethane 56 | 0.4 | 1.3 |
| Polyurethane 64 | 1.4 | 6.4 |
| Polyurethane 72 | 1.4 | 3.3 |
| PVC | * | * |

*Insulator

Example 10

Polyvinyl chloride (PVC) and several test plaques containing blends of 100 parts PVC and 30 parts ESD (antistatic) additives were prepared. The ESD additives compared were polyurethane 45, polyurethane 56, and a commercial ethylene oxide-epichlorohydrin (EO-ECH) copolymer. Also, a test plaque of a blend of 100 parts of vinyl chloride/acrylate copolymer and 30 parts polyurethane 45 was prepared. These plaques were compared for light transmission and percent haze. The results obtained show that haze can be reduced and light transmission increased when the refractive index of the two materials has been properly matched. Further, the results show that the commercially available antistatic materials are not suitable for clear applications. The results for percent light transmission were as measured according to ASTM D-1003 and for percent haze as measured using a Hunterlab model D-54P-5 spectrophotometer or equivalent. The results are summarized in Table V.

TABLE V

| LIGHT TRANSMISSION ASTM D-1003 | | |
|---|---|---|
| Sample | % Transmission | % Haze |
| PVC (Control) | 85.8 | 10.6 |
| PVC/Polyurethane 45 | 80.1 | 67.7 |
| Copolymer Resin/ Polyurethane 45 | 64.0 | 48.3 |
| PVC/Polyurethane 56 | 73.4 | 40.5 |
| PVC/EO-ECH Copolymer | 42.7 | 98.3 |

In accordance with the present embodiment of the invention, a particular polyurethane is described as an ESD agent which may be blended with one or more base polymers including polyolefin and polyamide polymers, in addition to those previously mentioned for the manufacture of articles. Further, blend compositions may be made based on the polyurethane ESD agent previously described by further incorporating a synergist comprising one or more of glass beads, glass spheres and polyvinyl chloride.

The base polymers (or matrix or host polymer) of the present embodiment include polyurethane other than the ESD agent, polyamides or nylons, polycarbonates, polyolefins, and styrene polymers and copolymers. Polymethylmethacrylate and polyamides can also be blended with the base polymers. These blends may be made using from about 3 to about 100, preferably from about 3 to about 80 parts;

and most preferably from about 5 to about 30 parts of ESD agent per 100 parts of base polymer.

Further, this blend composition as well as the blend compositions including other base polymers may be blended with a synergist comprising polyvinyl chloride, glass fibers, beads, or spheres to improve the electrostatic dissipating properties of the blend compositions. The synergist can be used in the range of from about 1 to about 60, preferably from about 3 to about 40, and most preferably from about 5 to about 30 parts per 100 parts of ESD agent and base polymer.

The polyurethanes which may be used as the base polymer for the present blend compositions include those polyurethanes previously described.

It should be noted that the polyurethanes useful for the base polymer may encompass both those polyurethanes based on the reaction of a polyester, a polyether, or a polycarbonate.

The polyurethanes which can be used as base polymers for the present embodiment are prepared by reacting an excess of polyisocyanate with an intermediate such as a hydroxyl terminated polyester, a hydroxyl terminated polyether, or mixtures thereof, and with one or more chain extenders. The hydroxyl terminated polyester intermediate of the intermediate is generally a linear polyester having a molecular weight of from about 500 to about 10,000. The molecular weight is determined by assay of the terminal functional groups and is an average molecular weight. The polymers are produced by (1) an esterification reaction of one or more glycols with one or more dicarboxylic acids or anhydrides or (2) by transesterification reaction, i.e., the reaction of one or more glycols with esters of dicarboxylic acids. Mole ratios generally in excess of more than one mole of glycol to acid are preferred so as to obtain linear chains having a preponderance of terminal hydroxyl groups.

A suitable reactor for the formation of a polyester intermediate also includes a ring opening polymerization which can utilize various lactones such as ε-caprolactone and can be initiated with a bifunctional initiator such as diethylene glycol.

The dicarboxylic acids of the desired polyester intermediate can be aliphatic, cycloaliphatic, aromatic, or combinations thereof. Suitable dicarboxylic acids which may be used alone or in mixtures generally have a total of from 4 to 15 carbon atoms and include: succinic, glutaric, adipic, pimelic, suberic, azelaic, sebacic, dodecanedioic, isophthalic, terephthalic cyclohexane dicarboxylic, and the like. Anhydrides of the above dicarboxylic acids such as phthalic anhydride, tetrahydrophthalic anhydride, or the like, can also be used. Adipic acid is the preferred acid. The glycols which are reacted to form a desirable polyester intermediate can be aliphatic, aromatic, or combinations thereof, and have a total of from 2 to 12 carbon atoms, and include ethylene glycol, propylene-1,2-glycol, 1,3-propanediol, butylene-1,3-glycol, 1,4-butanediol, 1,6-pentanediol, 1,6-hexanediol, 2,2-dimethylpropane-1,3-diol, 2,2-diethylene-1,3-diol, 1,4-cyclohexanedimethanol, decamethylene glycol, dodecamethylene glycol, and the like. 1,4-butanediol is the preferred glycol. Polyether glycols can also be used and include polytetramethylene ether glycol (PTMEG), polyethylene glycol, polypropylene glycol, ethylene oxide-capped polypropylene glycol, polytetramethylene/ethylene oxide ether glycol, and the like. Such polyether glycols can have a molecular weight of about 500 to 4,000.

Hydroxyl terminated polyether intermediates are polyether polyols derived from a diol or polyol having a total of from 2 to 15 carbon atoms, for example, an alkyl diol or glycol which is reacted with an ether comprising an alkylene oxide having from 2 to 6 carbon atoms, typically ethylene oxide or propylene oxide or mixtures thereof. For example, hydroxyl functional polyether can be produced by first reacting propylene glycol with propylene oxide followed by subsequent reaction with ethylene oxide. Primary hydroxyl groups resulting from ethylene oxide are more reactive then secondary hydroxyl groups and thus are preferred. Useful commercial polyether polyols include poly(ethylene glycol) comprising ethylene oxide reacted with ethylene glycol, poly(propylene glycol) comprising propylene oxide reacted with propylene glycol, poly(propylene-ethylene glycol) comprising propylene oxide and ethylene oxide reacted with propylene glycol, poly(tetramethylene glycol) comprising water reacted with tetrahydrofuran (PTMG), glycerol adduct comprising glycerol reacted with propylene oxide, trimethylolpropane adduct comprising trimethylolpropane reacted with propylene oxide, pentaerythritol adduct comprising pentaerythritol reacted with propylene oxide, and similar hydroxyl functional polyethers. Polyether polyols further include polyamide adducts of an alkylene oxide and can include for example ethylenediamine adduct comprising the reaction product of ethylenediamine and propylene oxide, diethylenetriamine adduct comprising the reaction product of diethylenetriamine with propylene oxide, and similar polyamide type polyether polyols. The various polyether intermediates generally have a molecular weight, as determined by assay of the terminal functional groups which is an average molecular weight, of from about 500 to about 10,000.

The desired polyurethane is made from the above-noted intermediate such as a hydroxyl terminated polyester or polyether which is further reacted with a polyisocyanate, preferably a diisocyanate, along with extender glycol. Examples of suitable diisocyanates include non-hindered aromatic diisocyanates such as: 4,4'-methylenebis-(phenyl isocyanate) (MDI); isophorone diisocyanate (IPDI), m-xylylene diisocyanate (XDI), as well as non-hindered cyclic aliphatic diisocyanates such as 1,4-cyclohexyl diisocyanate (CHDI), decane-1,10-diisocyanate, phenylene-1,4-diisocyanate, naphthalene-1,5-diisocyanate, diphenylmethane-3,3'-dimethoxy-4,4'-diisocyanate, dicyclohexylmethane-4,4'-diisocyanate, and cyclohexyl-1,4-diisocyanate.

Examples of suitable extender glycols (i.e., chain extenders) are lower aliphatic or short chain glycols having from about 2 to about 10 carbon atoms and include for instance ethylene glycol, diethylene glycol, propylene glycol, dipropylene glycol, 1,4-butane diol, 1,6-hexane diol, 1,3-butane diol, 1,5-pentane diol, 1,4-cyclohexane-dimethanol, hydroquinone di(hydroxyethyl)ether and 2-methyl 1,3, propanediol. Of course it should be understood that the base polymer will be a different polyurethane than the ESD agent of the present invention, i.e., the blend composition will always be a blend of at least two components even if they are both polyurethane type polymers.

In addition, the base polymer of the present invention may include polyolefins. With regard to the polyolefin, it generally can be any polyolefin or copolymer made from an olefin monomer having from 2 to 6 carbon atoms, such as polyethylene, polypropylene, polybutylene, etc., and halogenated polyolefins such as chlorinated polyethylene and preferably is a polypropylene having a melt index from about 1 to about 20 with a specific example being Profax 6523, made by Himont Inc. Such block copolymers are commercially available as Kraton from the Shell Chemical Company. Another class of such polyolefins is the various S-(E/B)-S block copolymers wherein the sphere S is made from a vinyl substituted aromatic having from 8 to about 12 carbon atoms as noted immediately hereinabove, with styrene being preferred, and the center block is a saturated ethylene-butylene rubber. Such a block copolymer is generally known as a hydrogenated kraton G as available from the Shell Chemical Company.

The styrene polymers which can be used as the base polymer in the present application include homopolymers of styrene (including modified polystyrene such as high impact polystyrene, "HIPS"), and copolymers of styrene such as the S-B-S polymers mentioned previously and ABS polymers (acrylonitrile- butadiene-styrene copolymers). Another class of a polyolefin is the various S-B-S block copolymers where the S block is made from a vinyl substituted aromatic having from 8 to about 12 carbon atoms such as styrene, alpha-methylstyrene, and the like, with styrene being preferred, and the B block is made from a conjugated diene having from 4 to 8 carbon atoms such as butadiene, isoprene, hexadiene, and the like, with butadiene being preferred. This phrase, "ABS" is meant to include other polymer resins in which one or more components have been replaced in whole or in part by similar analogous compounds. Exemplary of analogous compounds of acrylonitrile are methacrylonitrile, ethacrylonitrile, halogenated acrylonitriles, and the like, exemplary of analogous compounds of styrene are alpha-methyl styrene, chlorostyrene, vinyl toluene and the like; exemplary of analogous compounds of butadiene is isoprene, and the like. By other styrene containing polymers it is meant polystyrene modified by rubber, compounds of styrene and acrylonitrile copolymers (SAN); copolymers of styrene and acrylonitrile modified with acrylic elastomers (ASA); copolymers of styrene and acrylonitrile modified with ethylene-propylene-diene-monomer (ASE); copolymers of styrene and maleic anhydride; and the like. By ABS and other polymers containing styrene it is also meant polymer blends, which are the physical combination of two or more polymeric resin systems, having ABS and other polymers of styrene in the concentrations greater than 20 weight percent. Examples of polymeric materials suitable to form useful polymer blends with a styrene polymer include PVC, polycarbonate, nylon, polyphenylene ether polyphenylene oxide, chlorinated polyethaneand the like.

The polyamides, also known generally as "nylons," which are useful as the base polymer for the present invention include those polymers which are the reaction product of the condensation reaction of a diamine and a dibasic acid or of a diamine and an amino acid. They also include the reaction product of the additional polymerization of cyclic lactones. Examples of these compositions include nylon 6; nylon 66; nylon 6,10; and nylon 11. Copolymers of the same can also be used.

Examples of polycarbonates which are useful as the polymer in the present invention include the reaction product of aromatic diols such as bisphenol A with phosgene.

These blend compositions are made using an amount of base polymer of about 100 parts blended with an amount of an ESD agent at from about 3 to about 100; preferably from about 3 to about 40; and most preferably from about 5 to about 35 parts per 100 parts by weight of the base polymer or base polymer blends. The base polymer may also comprise a blend or alloy.

Further additives which may be added to the blend compositions include an ESD synergist. Surprisingly, while the synergist may have limited conductive properties on its own, this synergist acts to enhance the ESD properties of the ESD agent. It is believed that the mechanism by which the synergist works may be that the synergist effects the morphology of the composition so as to increase the proximity of the ESD additive domain; however, the invention should not be limited by this explanation.

The synergist is generally glass or its equivalent or small amounts of polyvinyl chloride or even a combination of the two. The form in which the glass is added to the composition could include for example, glass fibers, glass beads, and spheres, with a preferable form being hollow glass spheres. In the event that glass spheres are used, it is preferred that they are premixed with the ESD agent to form a masterbatch. This helps retain the integrity of the spheres. The glass spheres or fibers are added in an amount of from about 1 to about 60 parts, and preferably about 3 to about 40 parts. The spheres have the additional effect of reducing the specific gravity of the final composition.

The applications of the present blend compositions include those previously listed, but more specifically include sheet or films, fuel handling equipment such as fuel lines and vapor return equipment, business equipment, coatings for floors such as clean rooms and construction, applications, floorings, mats, electronic packaging and housings, chip holders, chip rails, tote bins and tote bin tops, medical applications and generally shaped articles.

The compositions can be used for various molding techniques including injection molding, blow molding, compression molding, slush molding, extrusion, thermoforming cast, rotational molding, sintering, and vacuum molding.

The present invention will be more fully understood with reference to the following examples:

EXAMPLES

ESD POLYMER USED IN EXAMPLES 11–15

Polyethylene glycol (Dow E-1450), 0.2 moles (290 g) having a molecular weight of 1473 as determined by end group analysis was blended at 60° C. with 0.348 moles (31.292 g) of 1,4-butane diol and 1.6 g of Ciba Geigy Irganox 1010. This blend or physical mixture was then reacted with 0.545 moles (136.25 g) of $4,4^1$-methylene-bis (phenyl isocyanate) (MDI) by a standard high temperature random melt polymerization procedure. The polymerization procedure involved heating the polyether/1,4-butane diol blend and MDI separately to about 120° C. and then mixing the ingredients. The reaction is exothermic and raises the temperature to about 200°to 285° C. in about 1–5 minutes, during which time polymerization takes place as evidenced by an increase in viscosity. At about 2–5 minutes into the reaction, 2.3 g of Hoechst Celanese Wax E is added. The sample was molded into a plaque and the physical properties were measured. The sample had a volume resistivity of $1.13 \times 10^9$ ohm-cm and a surface resistivity of $1.26 \times 10^{10}$ ohms/sq.

Examples 11–14

The ESD polymer described above was blended with base polymers by extrusion in a Berstorff ZE-25 twin screw extruder using a 33:1 L/D. The ESD polymer, the polycarbonate and the polyamide were each pre-dried before use. The ESD polymer and base polymer are bag mixed and fed to the extruder by a modified Pro-Rate auger feeder. The extruder is equipped with a two hole strand die; a vacuum is pulled at the vent. Strands are cooled on a belt conveyor and pelletized.

Example 11

| Formulation | |
|---|---|
| Emser Grilamid L25 Nylon 12 | 80 parts |
| ESD Polymer | 20 parts |
| Irganox 1010 | 1 part |
| Properties | |
| Surface Resistivity (ohms/sq.) | $1.05 \times 10^{12}$ |
| Volume Resistivity (ohm-cm) | $3.05 \times 10^{12}$ |
| Static Decay Time (sec.) | |
| 0% | 1.3 |
| 10% | 0.34 |
| Tensile Strength (psi) | 2960 |
| Tensile Modulus (psi) | 48,700 |
| Elongation at Break | 52 |
| Notched Izod Impact Strength (ft.Lbs./in.) | 15.6 |

Example 12

| Formulation | |
|---|---|
| Amoco H4E High Impact Polystyrene | 80 |
| ESD Polymer | 20 parts |
| Irganox 1010 | 1 part |
| Properties | |
| Surface Resistivity (ohms/sq.) | $5.53 \times 10^{11}$ |
| Volume Resistivity (ohm-cm) | $2.89 \times 10^{12}$ |
| Static Decay Time (sec.) | |
| 0% | 1.3 |
| 10% | 0.44 |
| Tensile Strength (psi) | 1685 |
| Tensile Modulus (psi) | 168,000 |
| Elongation at Break (%) | 3.0 |
| Notched Izod Impact Strength (ft.lbs./in.) | 0.64 |

Example 13

| Formulation | |
|---|---|
| Himont Profax 6523 Polypropylene | 80 |
| ESD Polymer | 20 parts |
| Irganox 1010 | 1 part |
| Properties | |
| Surface Resistivity (ohms/sq.) | $2.59 \times 10^{12}$ |
| Volume Resistivity (ohm-cm) | $1.36 \times 10^{13}$ |
| Static Decay Time (sec.) | |
| 0% | 1.75 |
| 10% | 0.53 |
| Tensile Strength (psi) | 2148 |
| Tensile Modulus (psi) | 101,000 |
| Elongation at Break (%) | 18 |
| Notched Izod Impact Strength (ft.lbs./in.) | 4.05 |

Example 14

| Formulation | |
|---|---|
| GE Lexan 101 Polycarbonate | 80 |
| ESD Polymer | 20 parts |
| Irganox 1010 | 1 part |
| Properties | |
| Surface Resistivity (ohms/sq.) | $1.32 \times 10^{13}$ |
| Volume Resistivity (ohm-cm) | $3.60 \times 10^{13}$ |
| Static Decay Time (sec.) | |
| 0% | 13.7 |
| 10% | 4.2 |
| Tensile Strength (psi) | 6938 |
| Tensile Modulus (psi) | 255,000 |
| Elongation at Break (%) | 87 |
| Notched Izod Impact Strength (ft.lbs./in.) | 13.8 |

Extrusion Conditions:

| Example No. | 11 | 12 | 13 | 14 |
|---|---|---|---|---|
| Barrel Temperatures (°C.) | 170–150 | 180–155 | 190–155 | 280–250 |
| Die Temperature (°C.) | 185 | 185 | 185 | 260 |
| Melt Temperature (°C.) | 228 | 197 | 197 | 269 |
| Screw Speed (RPM) | 195 | 195 | 190 | 175 |

Pellets were molded into tensile bars and 3"×6"×⅛" plaques using an Arburg Allrounder 40 ton, 2.2 oz. injection molder.

Example 15

The ESD polymer was dried and mixed with acrylonitrile-butadiene/styrene (ABS) resin in a Banbury mixer. The mixed compound was sheeted onto a mill and the sheet cubed. The cubed compound was then molded on the Arburg injection molder as described above.

Testing conducted according to the following standards:

Static Decay Time: Federal Test Method Standard 101C, Method 4046

Surface and Volume Resistivity: ASTM D-257

Tensile Properties: ASTM D-638

Izod Impact Strength, notched: ASTM D-256

Example 16

| Formulation | |
|---|---|
| ABS Compound | 80 parts by weight |
| ESD Polymer | 20 parts |
| Properties | |
| Surface Resistivity (ohms/sq.) | $2.3 \times 10^{12}$ |
| Volume Resistivity (ohm-cm) | $3.2 \times 10^{13}$ |
| Static Decay Time (sec.) | |
| 0% | 1.8 |
| 10% | 0.6 |
| Tensile Strength (psi) | 4346 |
| Tensile Modulus (psi) | 259,000 |

| | |
|---|---|
| Elongation at Break (%) | 8 |
| Notched Izod Impact Strength (ft.lbs./in.) | 1.9 |

A thermoplastic polyurethane, "TPU56" was prepared as generally described for Example 3 and was blended in various polyurethane base polymers. The blending procedures are generally those described in Examples 11–14. Different synergists were also tested including polyvinyl chloride ("PVC") and glass fiber and spheres. The static decay at 15 percent relative humidity ("RH") was measured. This data is set forth in Tables VI–X.

TABLE VI

STATIC DECAY AT 15 PERCENT RH in different type TPU's

| | 17 | 18 | 19 | 20 | 21 | 22 | 23 | 24 | 25 |
|---|---|---|---|---|---|---|---|---|---|
| CONDUCTIVE TPU 56 | 100 | | | | | 30 | 50 | 30 | 50 | 30 |
| POLYESTER TPU 1 | | 100 | | | 70 | 50 | | | |
| POLYESTER TPU 3 | | | 100 | | | | 70 | 50 | |
| POLYESTER TPU 4 | | | | 100 | | | | | 70 |
| STATIC DECAY (SFC.) | | | | | | | | | |
| 10% | .04 | INS | INS | 1.2 | 1.8 | 1.3 | >30 | 1.3 | 1.0 |
| 0% | .07 | INS | INS | 2.8 | 4.4 | 4.1 | >30 | 4.1 | 2.2 |

TABLE VII

STATIC DECAY AT 15 PERCENT RH with small amount of PVC

| | 26 | 27 | 28 | 29 | 30 | 31 | 32 | 33 | 34 | 35 |
|---|---|---|---|---|---|---|---|---|---|---|
| CONDUCTIVE TPU 56 | 100 | | | 30 | 50 | 30 | 25 | 25 | | 30 |
| POLYESTER TPU 1 | | 100 | | 70 | 50 | | 50 | | | |
| POLYESTER TPU 4 | | | 100 | | | 70 | | | | 60 |
| PVC 1 | | | | | | | 25 | | | |
| PVC 2 | | | | | | | | 75 | 100 | |
| PVC 3 | | | | | | | 10 | | | |
| STATIC DECAY (SEC.) | | | | | | | | | | |
| 10% | .04 | INS | 1.2 | 1.8 | .5 | 1.0 | 1.8 | .04 | 1.9 | .04 |
| 0% | .07 | INS | 2.8 | 4.4 | 1.1 | 2.2 | 4.2 | .08 | 4.5 | .08 |

TABLE VIII

STATIC DECAY AT 15 PERCENT RH with glass fibers and hollow glass spheres

| | 36 | 37 | 38 | 39 | 40 | 41 | 42 | 43 |
|---|---|---|---|---|---|---|---|---|
| CONDUCTIVE TPU 56 | 100 | | | 30 | 30 | 30 | | 30 |
| POLYESTER TPU 1 | | 100 | | 70 | 60 | | | |
| POLYESTER TPU 5 | | | 100 | | | 51 | 60 | 70 |
| GLASS FIBER | | | | | 10 | | | |
| HOLLOW GLASS SPHERES | | | | | | 19 | 40 | |
| STATIC DECAY (SEC.) | | | | | | | | |
| 10% | .04 | INS | 7.2 | 1.8 | 2.5 | .45 | 6.5 | 2.3 |
| 0% | .07 | INS | 18.3 | 4.4 | 7.6 | .84 | 20.6 | 5.7 |

TABLE IX

STATIC DECAY AT 15 PERCENT RH with hollow glass spheres and small amounts of PVC

| | 44 | 45 | 46 | 47 | 48 |
|---|---|---|---|---|---|
| CONDUCTIVE TPU 56 | 100 | | 30 | 30 | 30 |
| POLYESTER TPU 5 | | 100 | 70 | 51 | 44 |
| HOLLOW GLASS SPHERES | | | | 19 | 16 |
| PVC 3 | | | | | 10 |
| STATIC DECAY (SEC.) | | | | | |
| 10% | .04 | 7.2 | 2.3 | .45 | .09 |
| 0% | .07 | 18.3 | 5.7 | .84 | .18 |

TABLE X

LIGHT TRANSMISSION/PERCENT HAZE VS. STATIC DECAY

|  | 49 | 50 | 51 | 52 | 53 | 54 | 55 |
|---|---|---|---|---|---|---|---|
| CONDUCTIVE TPU 56 | 100 |  |  |  | 30 | 50 | 30 |
| POLYESTER TPU 1 |  | 100 |  |  | 70 | 50 |  |
| POLYESTER TPU 3 |  |  | 100 |  |  |  |  |
| POLYESTER TPU 4 |  |  |  | 100 |  |  | 70 |
| STATIC DECAY |  |  |  |  |  |  |  |
| 10% | .04 | INS | INS | 1.2 | 1.8 | 1.3 | 1.0 |
| 0% | .07 | INS | INS | 2.8 | 4.4 | 4.1 | 2.2 |
| % TRANSMISSION | 47.2 | 70.3 | 84.8 | 80.0 | 1.2 | 80.0 | 1.2 |
| % HAZE | 44 |  |  | 17.4 | 5.5 | 9.7 | 94.6 |

The above preferred embodiments and examples are given to illustrate the scope and spirit of the present invention. These embodiments and examples will make apparent, to those skilled in the art, other embodiments and examples. These other embodiments and examples are within the contemplation of the present invention. Therefore, the present invention should be limited only by the appended claims.

What is claimed is:

1. An electrostatic dissipating polymeric composition having a volume resistivity of less than $1 \times 10^{13}$ Ohm-cm comprising a blend of from about 3 to about 80 parts of an ESD agent blended with 100 parts of a matrix polymer, said ESD agent comprising the reaction product of:

a) a homopolymer or copolymer of polyethylene glycol comprising either a homopolymer of ethylene glycol having a weight average molecular weight from about 1000 to about 2000 and comprising repeating ethylene ether units wherein the number of repeat units is from about 20 to about 45 or a copolymer of ethylene glycol and another glycol, said copolymer having a weight average molecular weight from about 1000 to about 5000 and comprising repeating ethylene ether units wherein the number of repeat units is from about 20 to about 115;

b) a non-hindered diisocyanate which is an aromatic or cyclic aliphatic diisocyanate;

c) an extender glycol having from 2 to 10 carbon atoms and containing only primary alcohol groups wherein said diisocyanate is reacted at from 0.95 to 1.06 moles per mole of polyethylene glycol and extender glycol; and said base polymer being one or more polymers selected from the group consisting of polyurethanes, polyamides, polycarbonates, polyolefins, polyphenylene oxide, polyacetal and styrene polymers, and blends and copolymers thereof; with the provisos that said ESD agent and said base polymer are not identical.

2. An electrostatic dissipating composition as set forth in claim 1, wherein said extender glycol is present at from about 0 to about 35 moles for each mole of polyethylene glycol and said diisocyanate is reacted at from about 0.95 to about 1.06 moles per mole of polyethylene glycol plus extender glycol.

3. An electrostatic dissipating composition as set forth in claim 1, wherein said non-hindered diisocyanate is 4,4'-methylene-bis (phenyl isocyanate).

4. An electrostatic dissipating polymeric composition as set forth in claim 1 which comprises from about 3 to about 80 parts of said ESD agent blended with about 100 parts of said base polymer.

5. An electrostatic dissipating polymeric composition as set forth in claim 1 wherein a) is a copolymer made from ethylene glycol and one or more of propylene glycol, 1,2-butylene oxide, epichlorohydrin, allyl glycidyl ether, n-butyl glycidyl ether, glycidyl acrylate, glycidyl methacrylate, 2-ethylhexyl glycidyl ether, tetrahydrofuran, and styrene oxide.

6. An electrostatic dissipating polymeric composition as set forth in claim 1, wherein said extender is one or more compositions selected form the group consisting of ethylene glycol, diethylene glycol, propylene glycol, dipropylene glycol, 1,4-butane diol, 1,6-hexane diol, 1,3-butane diol, 1,5-pentane diol, 1,4-cyclohexane-dimethanol, hydroquione di(hydroxyethyl) ether and 2-methyl 1,3-propanediol.

7. A thermoplastic polyurethane composition having a volume resistivity of less than $1 \times 10^{13}$ Ohm-cm comprising a blend of a base polymer and a polyurethane electrostatic dissipating agent, comprising:

a) the reaction product of a hydroxy-terminated ethylene ether oligomer reacted with a nonhindered diisocyanate and an aliphatic extender glycol to produce said thermoplastic polyurethane, said oligomer intermediate being a homopolymer or copolymer of polyethylene glycol consisting of either a homopolymer of ethylene glycol having a weight average molecular weight from about 1000 to about 2000 and comprising repeating ethylene ether units wherein the number of repeat units is from about 20 to about 45 or a copolymer of ethylene glycol and another glycol, said copolymer having a weight average molecular weight from about 1000 to about 5000 and comprising repeating ethylene ether units wherein the number of repeat units is from about 20 to about 115; wherein said nonhindered diisocyanate is an aromatic or cycloaromatic diisocyanate and wherein said diisocyanate is reacted at from 0.95 to 1.06 moles per mole of ethylene ether oligomer and extender glycol; wherein said extender glycol consists of an aliphatic non-ether glycol having from 2 to 6 carbon atoms and containing only primary alcohol groups; and b) said base polymer comprises a polyurethane, with the proviso that said ESD agent and said polyurethane are different polyurethanes.

8. A thermoplastic composition as set forth in claim 7 which comprises from about 3 to about 80 parts of said ESD agent blended with about 100 parts of said base polymer.

9. A thermoplastic composition as set forth in claim 7 wherein a) is a copolymer made from ethylene glycol and one or more of propylene glycol, 1,2-butylene oxide, epichlorohydrin, allyl glycidyl ether, n-butyl glycidyl ether, glycidyl acrylate, glycidyl methacrylate, 2-ethylhexyl glycidyl ether, tetrahydrofuran, and styrene oxide.

10. A thermoplastic polyurethane composition as set forth in claim 7, wherein said extender is one or more compositions selected from the group consisting of ethylene glycol, diethylene glycol, propylene glycol, dipropylene glycol, 1,4-butane diol, 1,6-hexane diol, 1,3-butane diol, 1,5-pentane diol, 1,4-cyclohexane-dimethanol, hydroquione di(hydroxyethyl) ether and 2-methyl 1,3-propanediol.

11. A shaped article comprising a thermoplastic polyurethane composition having a volume resistivity of less than $1 \times 10^{13}$ Ohm-cm comprising a blend of a base polymer and a polyurethane electrostatic dissipating agent, said polyurethane electrostatic dissipating agent comprising:

a) the reaction product of a hydroxy-terminated ethylene ether oligomer reacted with a nonhindered diisocyanate and an aliphatic extender glycol to produce said thermoplastic polyurethane, said oligomer intermediate being a homopolymer or copolymer of polyethylene glycol consisting of either a homopolymer of ethylene glycol having a weight average molecular weight from about 1000 to about 2000 and comprising repeating ethylene ether units wherein the number of repeat units is from about 20 to about 45 or a copolymer of ethylene glycol and another glycol, said copolymer having a weight average molecular weight from about 1000 to about 5000 and comprising repeating ethylene ether units wherein the number of repeat units is from about 20 to about 115; wherein said nonhindered diisocyanate is an aromatic or cycloaromatic diisocyanate wherein said diisocyanate is reacted at from 0.95 to 1.06 moles per mole of ethylene ether oligomer and extender glycol; wherein said extender glycol consists of an aliphatic non-ether glycol having from 2 to 6 carbon atoms and containing only primary alcohol groups; and b) said base polymer comprising one or more of a polymer or copolymer of styrene, polycarbonate polymers, or copolymers, polyamide polymers or copolymers, polyester polymers or copolymers, polyurethane polymers or copolymers.

12. A shaped article as set forth in claim 11 which comprises from about 3 to about 80 parts of said ESD agent blended with about 100 parts of said base polymer.

13. A shaped article as set forth in claim 11 wherein a) is a copolymer made from ethylene glycol and one or more of propylene glycol, 1,2-butylene oxide, epichlorohydrin, allyl glycidyl ether, n-butyl glycidyl ether, glycidyl acrylate, glycidyl methacrylate, 2-ethylhexyl glycidyl ether, tetrahydrofuran, and styrene oxide.

14. A shaped article as set forth in claim 11, wherein said extender is one or more compositions selected from the group consisting of ethyleneglycol, diethylene glycol, propylene glycol, dipropylene glycol, 1,4-butane diol, 1,6-hexane diol, 1,3-butane diol, 1,5-pentane diol, 1,4-cyclohexanedimethanol, hydroquione di(hydroxyethyl) ether and 2-methyl 1,3-propanediol.

* * * * *